US006332527B1

(12) United States Patent
Wierschke

(10) Patent No.: US 6,332,527 B1
(45) Date of Patent: Dec. 25, 2001

(54) TRANSPORT APPARATUS FOR HANDLING CUT PRODUCTS

(75) Inventor: Larry D. Wierschke, Green Bay, WI (US)

(73) Assignee: Paper Converting Machine Company, Green Bay, WI (US)

( * ) Notice: Subject to any disclaimer, the term of this patent is extended or adjusted under 35 U.S.C. 154(b) by 0 days.

(21) Appl. No.: 09/174,951

(22) Filed: Oct. 19, 1998

(51) Int. Cl.$^7$ .................... B65G 47/46

(52) U.S. Cl. .................... 198/369.7; 198/436; 198/348; 83/104

(58) Field of Search .................... 198/348, 349, 198/359, 369.7, 436, 437; 83/102, 104

(56) References Cited

U.S. PATENT DOCUMENTS

| | | | | |
|---|---|---|---|---|
| Re. 30,598 | | 5/1981 | Spencer . | |
| 2,229,638 | * | 1/1941 | Chamberlin et al. | 83/104 |
| 3,214,002 | * | 10/1965 | Kirpatrick et al. | 198/369.7 |
| 3,426,886 | * | 2/1969 | Aro | 198/369.7 |
| 3,545,630 | * | 12/1970 | Ivanto | 198/369.7 |
| 3,572,681 | | 3/1971 | Nystrand . | |
| 4,147,557 | * | 4/1979 | Mayo | 198/359 |
| 4,210,527 | * | 7/1980 | Paterson et al. | 198/369.7 |
| 4,429,517 | * | 2/1984 | Lohrentz et al. | 198/369.7 |
| 4,462,287 | | 7/1984 | Weis . | |
| 4,474,094 | * | 10/1984 | Hanni et al. | 83/104 |
| 4,684,008 | * | 8/1987 | Hayashi et al. | 198/436 |
| 4,977,803 | | 12/1990 | Blom . | |
| 5,289,747 | | 3/1994 | Wunderlich . | |
| 5,458,033 | | 10/1995 | Wierschke . | |
| 5,475,917 | | 12/1995 | Biagiotti . | |

FOREIGN PATENT DOCUMENTS

| | | |
|---|---|---|
| 668 132B1 | 2/1995 | (EP) . |
| 2 137 918 | 10/1984 | (GB) . |

* cited by examiner

*Primary Examiner*—Robert P. Olszewski
*Assistant Examiner*—Steven B. McAllister

(57) ABSTRACT

A transport apparatus for handling rows of units of multi-ply material such as rolls of bathroom tissue or paper toweling and stacks of folding facial tissue or toweling includes a pair of movable shuttles which can be moved together to provide a bridge for conveying the units over an opening and which can be moved apart to provide a gap so that trim pieces or selected units can fall through the opening. When the shuttles are moved to an upstream position, the shuttles bridge the opening, and units can be moved over the shuttles and over the opening. When a trim piece or selected unit is positioned just upstream of the downstream shuttle, the downstream shuttle is moved in a downstream direction away from the upstream shuttle to provide a gap between the shuttles so that the trim piece or selected unit falls through the gap and the opening. The upstream shuttle can then be moved in a downstream direction toward the downstream shuttle to close the gap.

7 Claims, 19 Drawing Sheets

TRANSPORT APPARATUS FOR HANDLING CUT PRODUCTS

BACKGROUND

This invention relates to a transport apparatus for handling cut products. More particularly, the invention relates to a transport apparatus for use with a saw which transversely severs multi-ply material such as logs of bathroom tissue and kitchen toweling and bolts of folded facial tissue and toweling.

In all present saws, the log or bolt is subjected to transverse cutting to develop a plurality of retail sized rolls or stacks. Also developed from the transverse cutting are two end trim pieces. These are present due to the log or bolt length being longer than an even multiple of the number of products cut therefrom. Co-owned U.S. Pat. No. Re. 30,598 describes a saw for cutting a log of convolutely wound paper tissue or toweling or a bolt of folded paper tissue or toweling. U.S. Pat. No. 3,572,681 describes a machine for producing bolts.

Typically, the cut product is carried in some fashion, with an interruption in the transport mechanism which corresponds to the trim locations. An example of a prior art apparatus for removing trims, while transporting cut product, is the belt and rail system which was based on the length-to-width ratio of the cut product.

The problem with the prior art, such as the belt and rail system, is that this type removed a high percentage of the trim pieces, but was not perfect. It was acceptable on the slower saws, with less automatic wrapping equipment. With higher speeds and more automation, the mechanical gripper finger style shown, for example, in U.S. Pat. No. 4,977,803 was used. The shortcomings with this unit are that the fingers are susceptible to breakage during jams, the fingers and cam followers are considered a high maintenance item, the finger roll diameter range is not always adequate, and the constant pitch (spacing) of the fingers requires that the incoming rolls are also on a constant pitch. This means that if the cutoff length is changed (a new roll pitch or length), the roll pitch between logs also changes, making the fingers end up out of phase with the rolls. The problem of phase differences due to changes in roll and/or log lengths has been addressed with drive train changes or the use of servo drives on the finger conveyor, but this has still not provided the solution desired by producers of these cut products.

The vacuum belts system (e.g., U.S. Pat. No. 5,458,033) addressed the problems of phasing for cut length and log length, and made for easier adjustment for roll diameter. But the vacuum system requires additional energy to run and moves air. The moving air creates noise that requires the use of a silencer and creates dust that requires a filter which needs regular cleaning, i.e., maintenance. The vacuum can also lift the tail end of the wound paper from the rolls and thereby adversely affect the tail seal.

SUMMARY OF THE INVENTION

The invention provides a novel transport apparatus for cut products which uses few moving parts while eliminating all mechanical adjustments for size changes to the cut product. The apparatus receives cut product and trim ends from the conveyor of the saw. The apparatus supports cut product over an open span to a conveyor which delivers the cut product to packaging equipment or other processing machinery. However, the trim ends or one or more selected cut products are allowed to fall through the open span and do not reach the conveyor.

DESCRIPTION OF THE DRAWINGS

The invention will be explained in conjunction with an illustrative embodiment shown in the accompanying drawing, in which—

DESCRIPTION OF SPECIFIC EMBODIMENT

General Description

Figure 1:
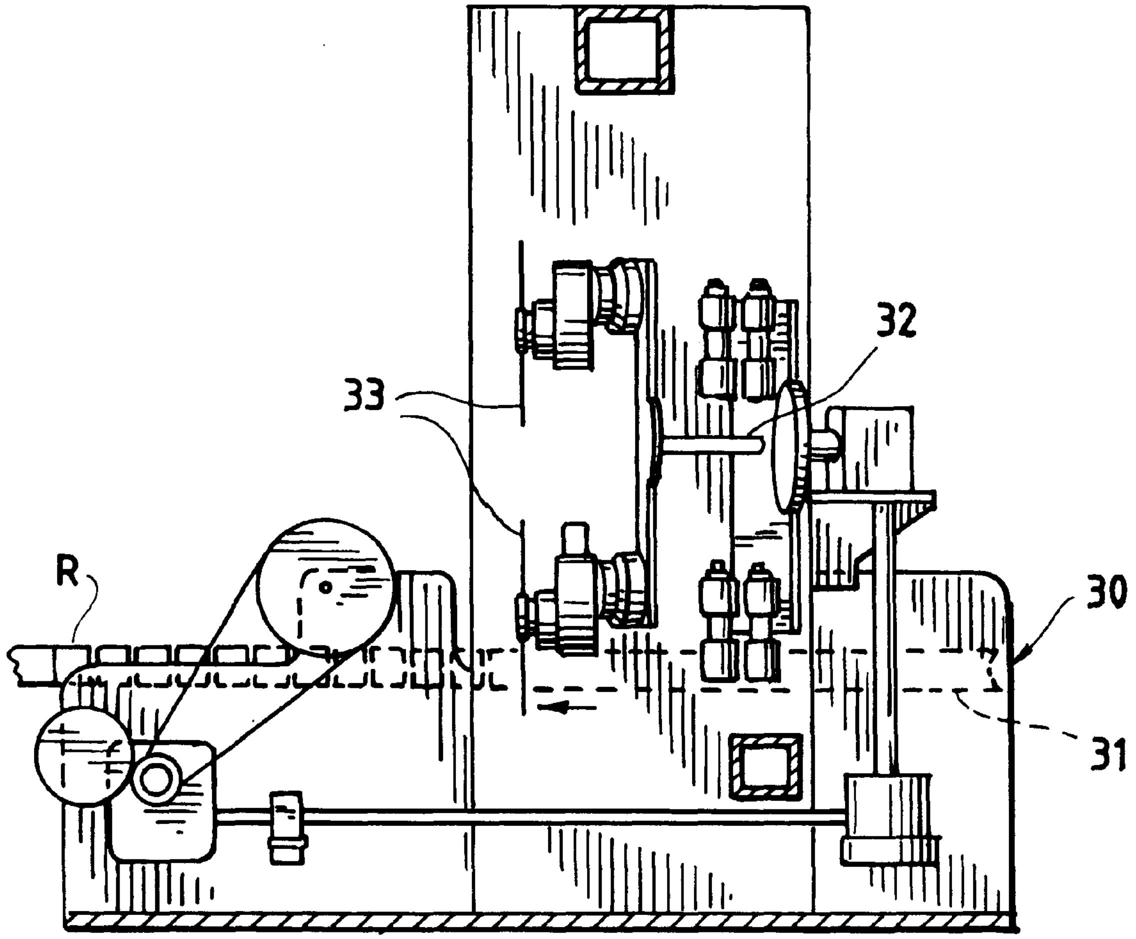
FIG. 1 PRIOR ART
FIG. 1 is a side elevational view of a prior art log saw of the type which is described in U.S. Pat. No. Re. 30,598.

Referring first to FIG. 1, the numeral 30 designates generally a frame of a conventional log saw which is equipped with a horizontally extending conveyor 31. Arranged on a rotating shaft 32 are blades or discs 33 which orbit so as to transversely sever the log L into identical rolls R. The details of the log saw are described in U.S. Pat. No. Re. 30,598.

A typical saw includes (in the order of travel) clamps to hold the product as the saw blade passes through, thus generating another discrete product, stationary troughs to support the cut products, and a conveyor with multiple pusher heads to transport the product up to the point of cutting and continuing through the clamps and stationary troughs to push all cut product out of the saw. This construction is normally found in saws having from one to four lanes. These lanes are not always on the same level due to the swing arc of the cutting blades. For clarity, the following description will refer primarily to only one lane since adding additional lanes does not affect the function or operation. The flow of product out of the saw may be of a continuous (steady speed) nature, an indexing (start-stop) nature, or a substantially continuous nature (see, for example, U.S. Pat. No. 5,289,747).

Figure 2:
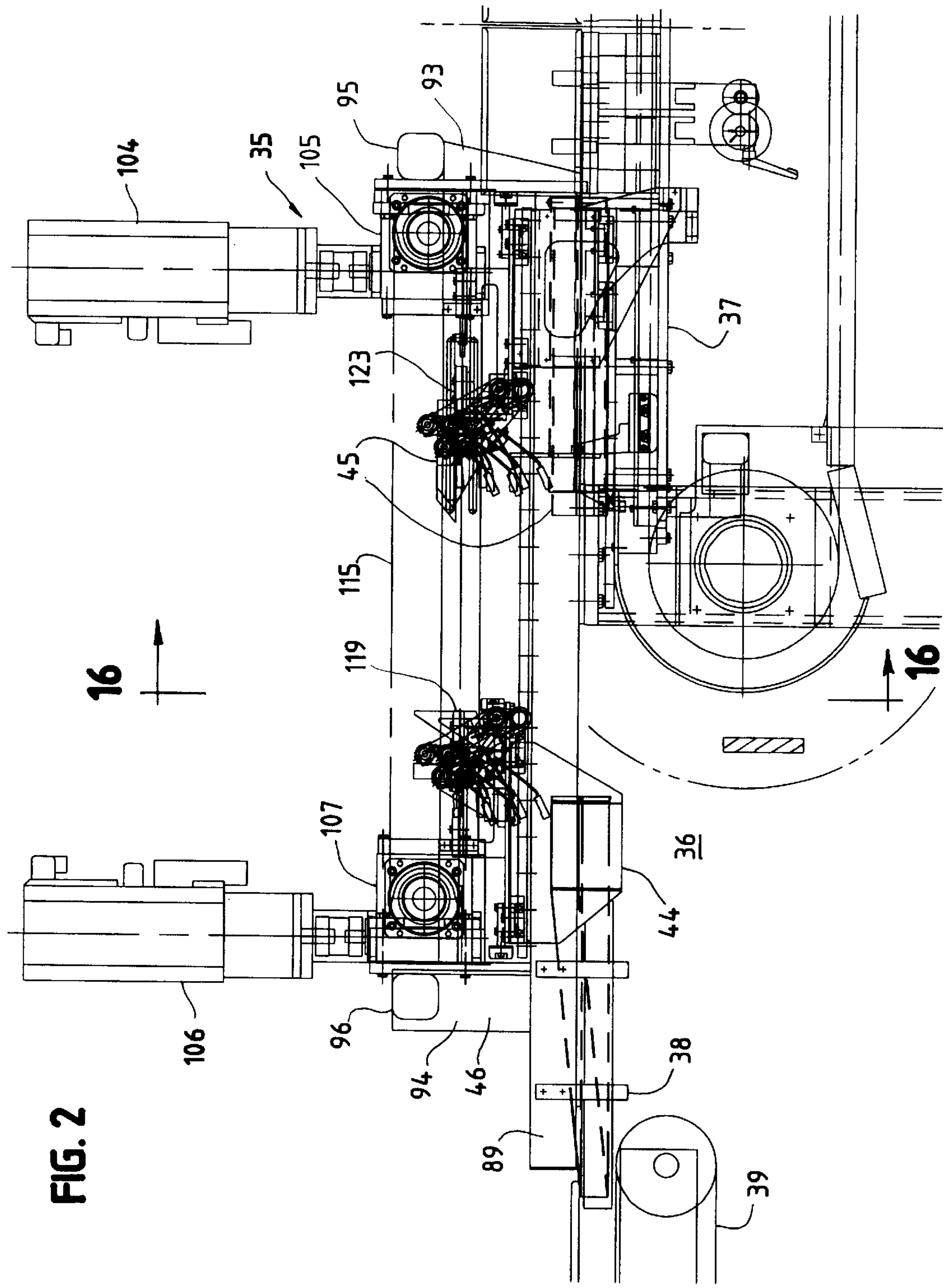
FIG. 2 is a side elevational view of the inventive transport apparatus which bridges the gap or opening between the conveyor of a log saw and a downstream conveyor.
Figure 3:
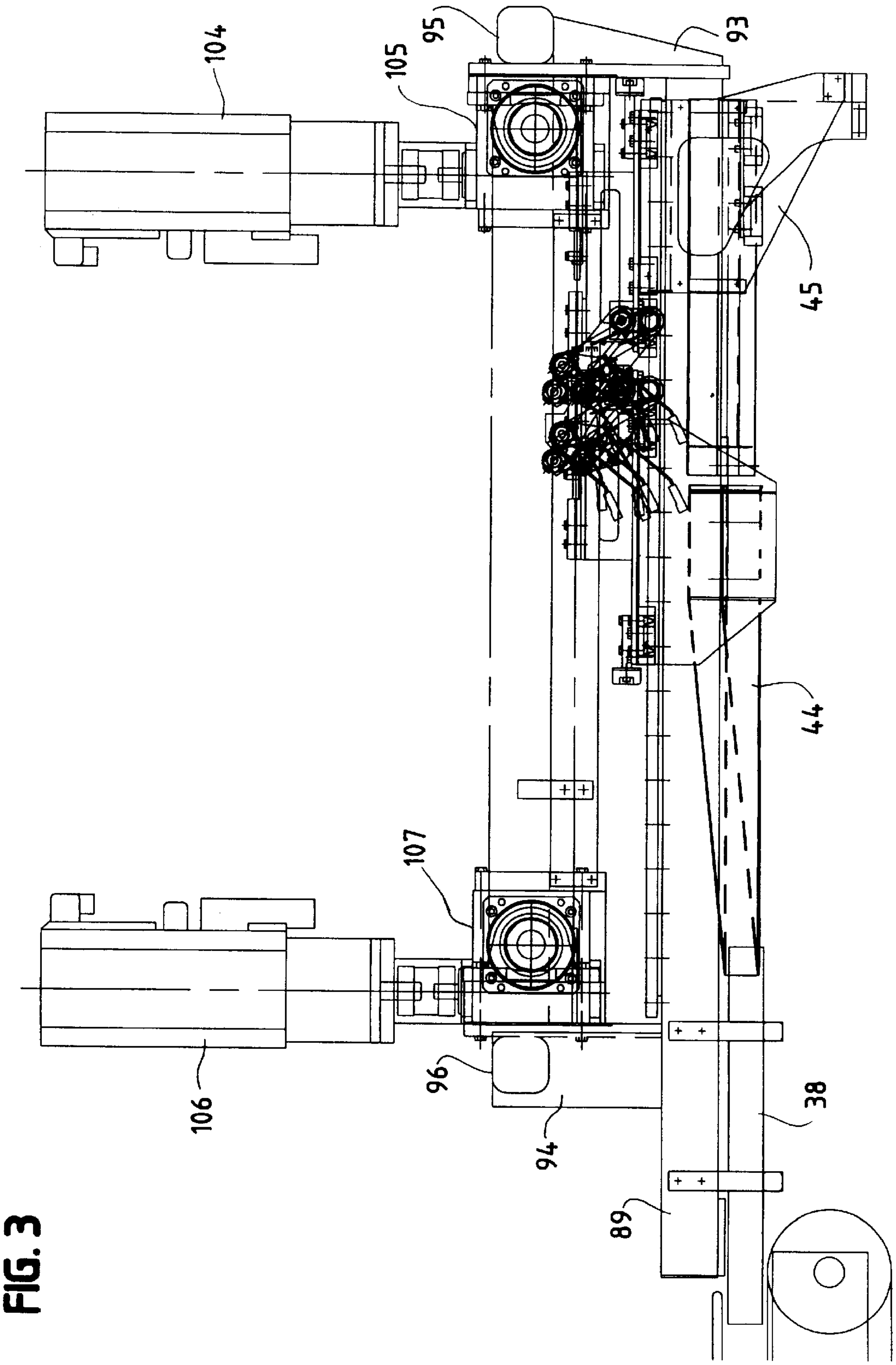
FIG. 3 is a view similar to FIG. 2 but omits the log saw conveyor.
Figure 4:
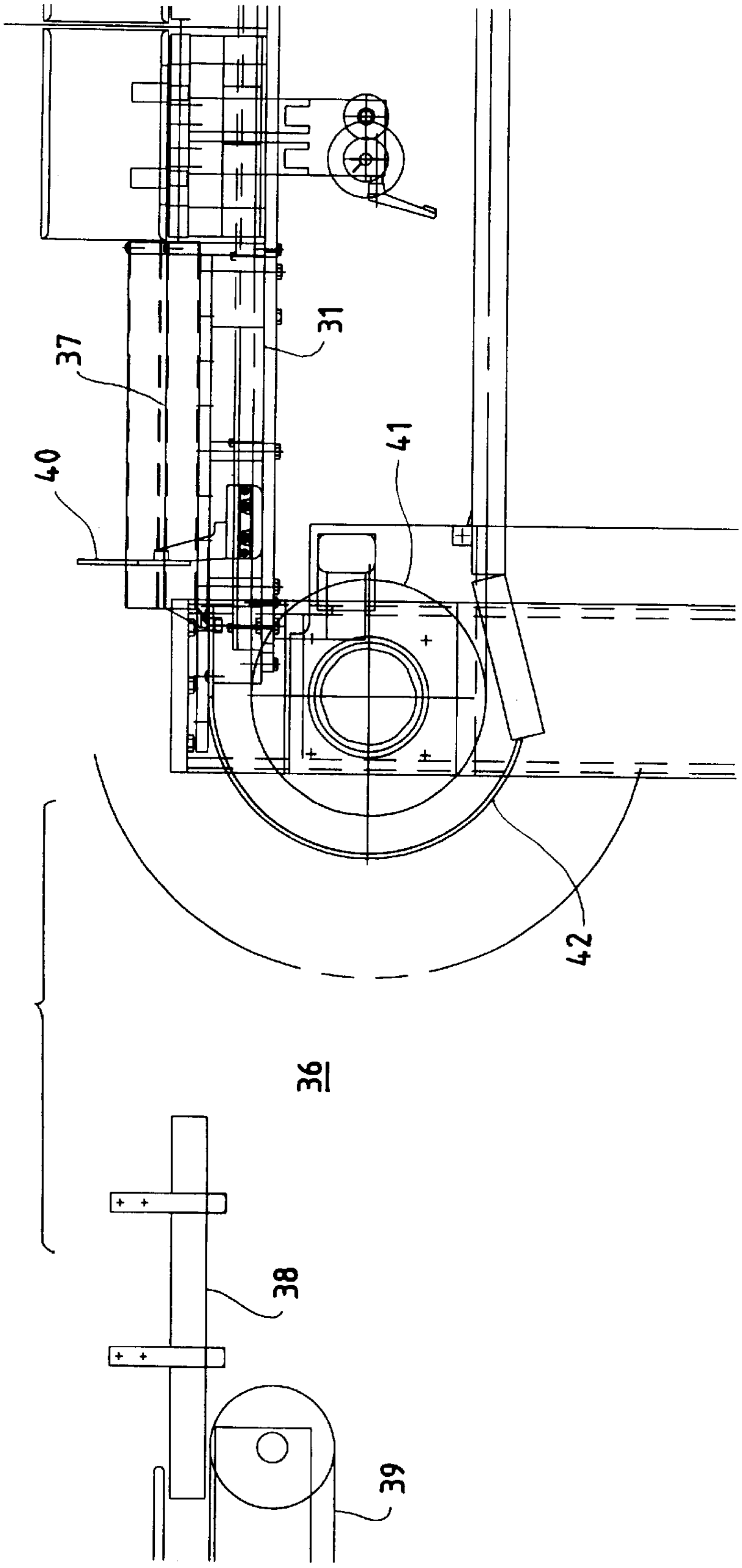
FIG. 4 is a side elevational view of the log saw conveyor and the downstream conveyor, omitting the inventive transport apparatus.

Referring now to FIGS. 2 and 4, a transport assembly 35 bridges a gap or opening 36 between the stationary trough 37 of the log saw and a stationary trough 38 which feeds product to a downstream conveyor 39. The two stationary troughs are shown without the transport apparatus in FIG. 4. The stationary trough 37 is mounted at the downstream end of the conveyor 31 of the log saw. A plurality of pusher heads 40 are mounted on a continuous belt which is entrained around a downstream pulley 41 and an upstream pulley (not shown). A guard 42 covers the pulley 41.

Figure 9:
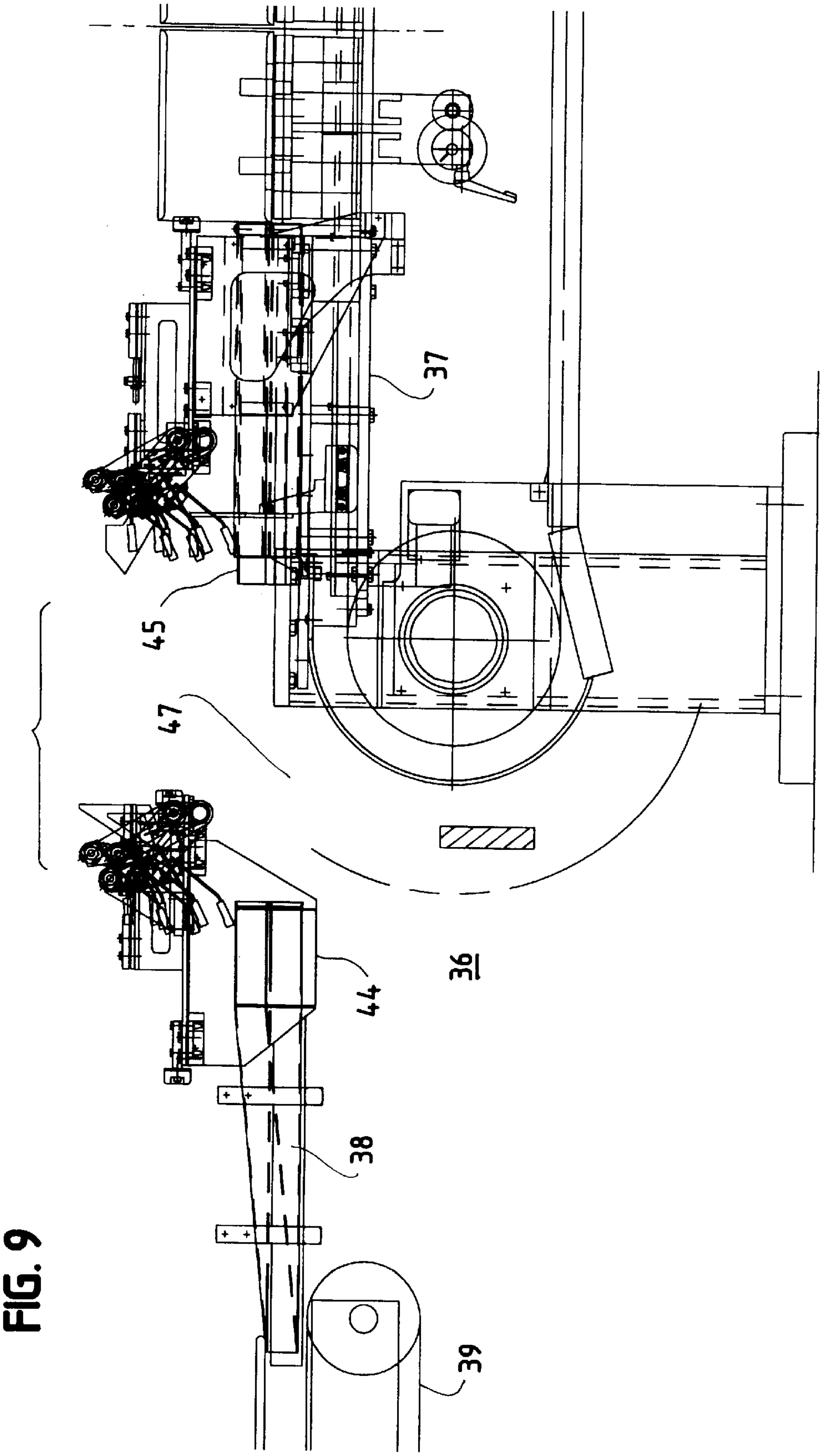
FIG. 9 is a view similar to FIG. 4 but showing the trailing and leading shuttles in their maximum gap position.
Figure 12:
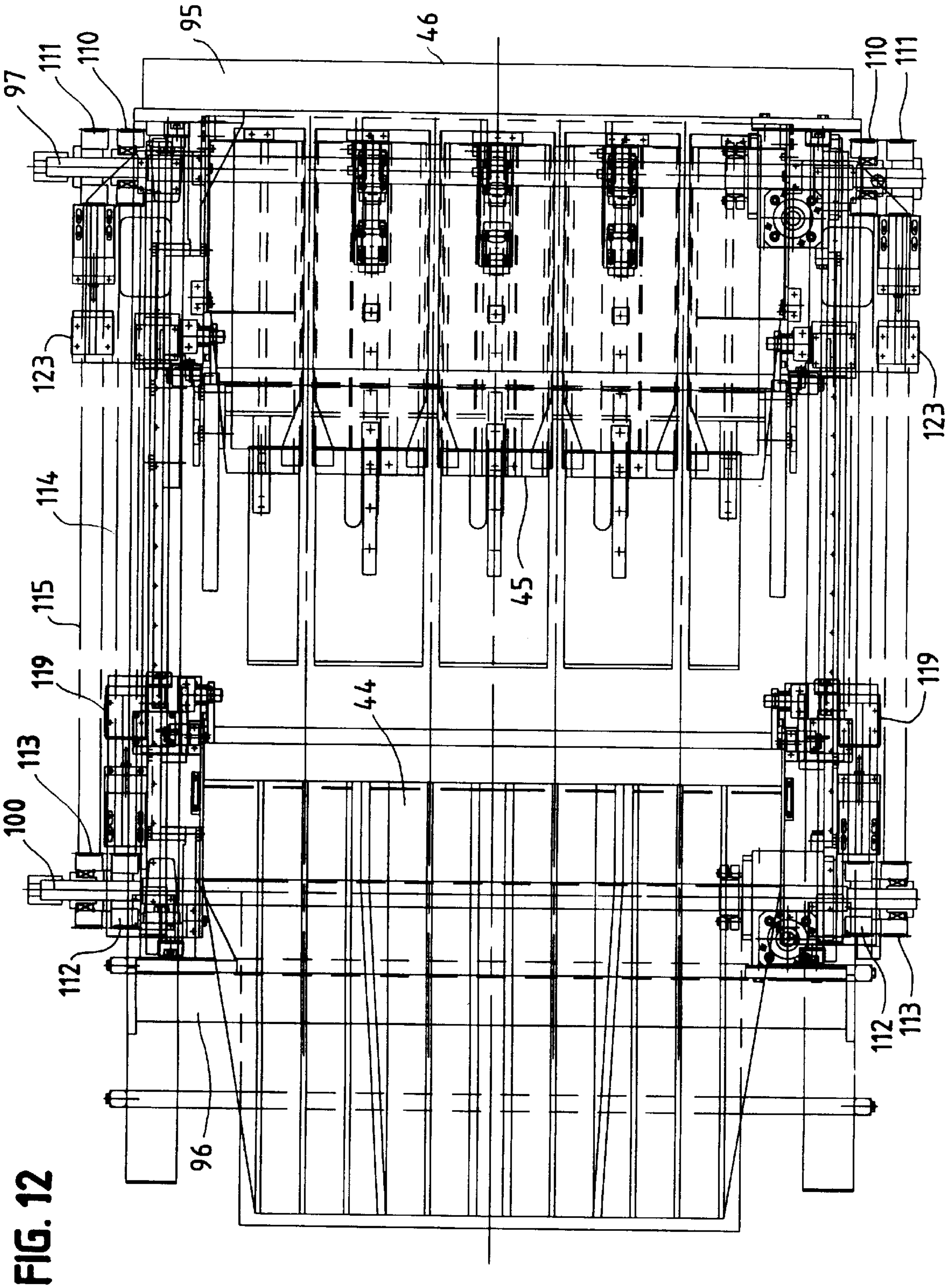
FIG. 12 is a top plan view of the transport apparatus without the grippers.

Returning to FIG. 2, the transport assembly 35 includes a trailing shuttle 44 (see also FIG. 5) and a leading shuttle 45 (see also FIG. 6) which are mounted for reciprocation on a frame 46 (see also FIG. 12). FIG. 9 illustrates the shuttles without the frame for clarity of illustration. In FIGS. 2 and 9, the trailing shuttle 44 is in its maximum downstream position, and the leading shuttle 45 is in its maximum upstream position. The shuttles are spaced apart to provide a gap 47.

Figure 10:
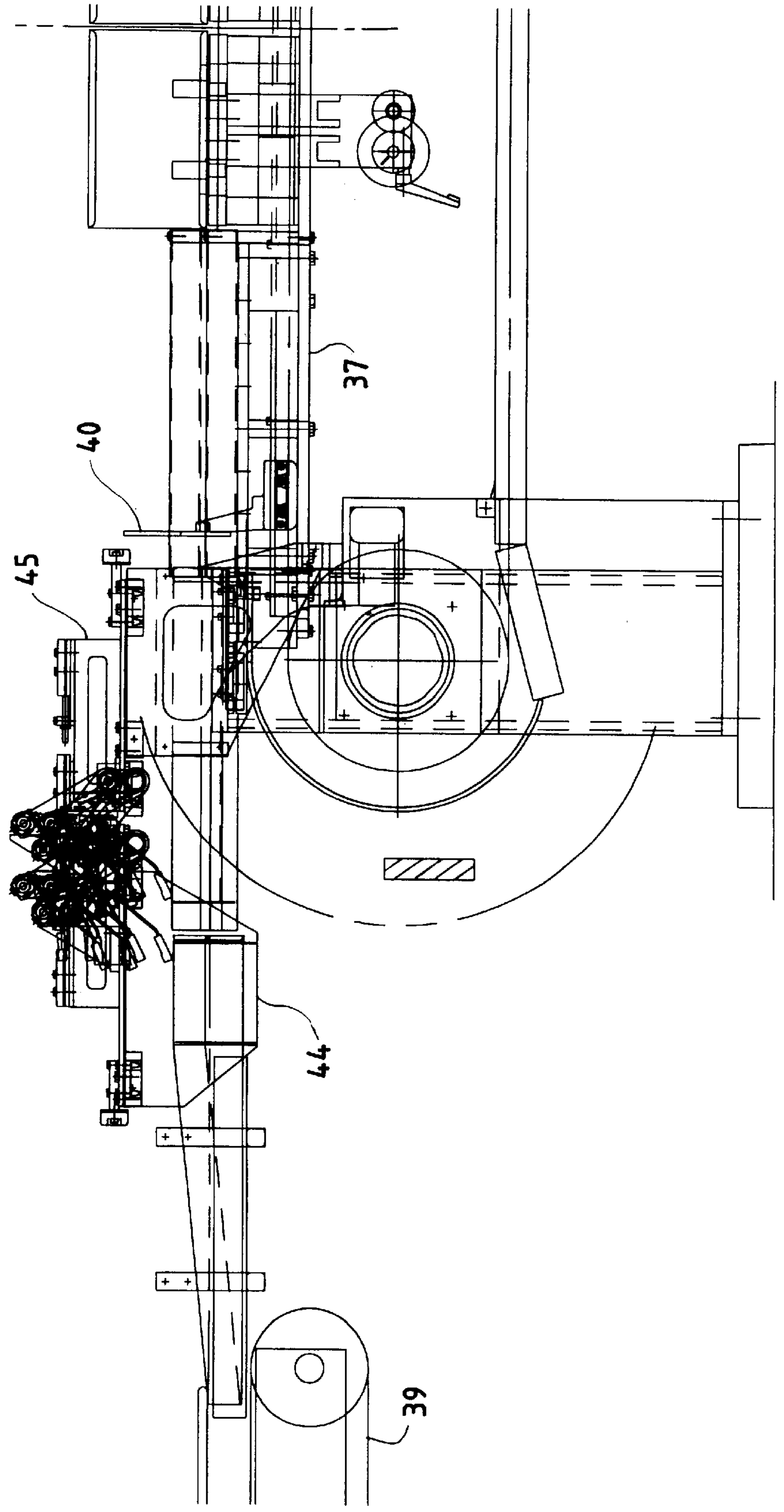
FIG. 10 is a view similar to FIG. 9 but showing both shuttles in their maximum downstream positions.
Figure 11:
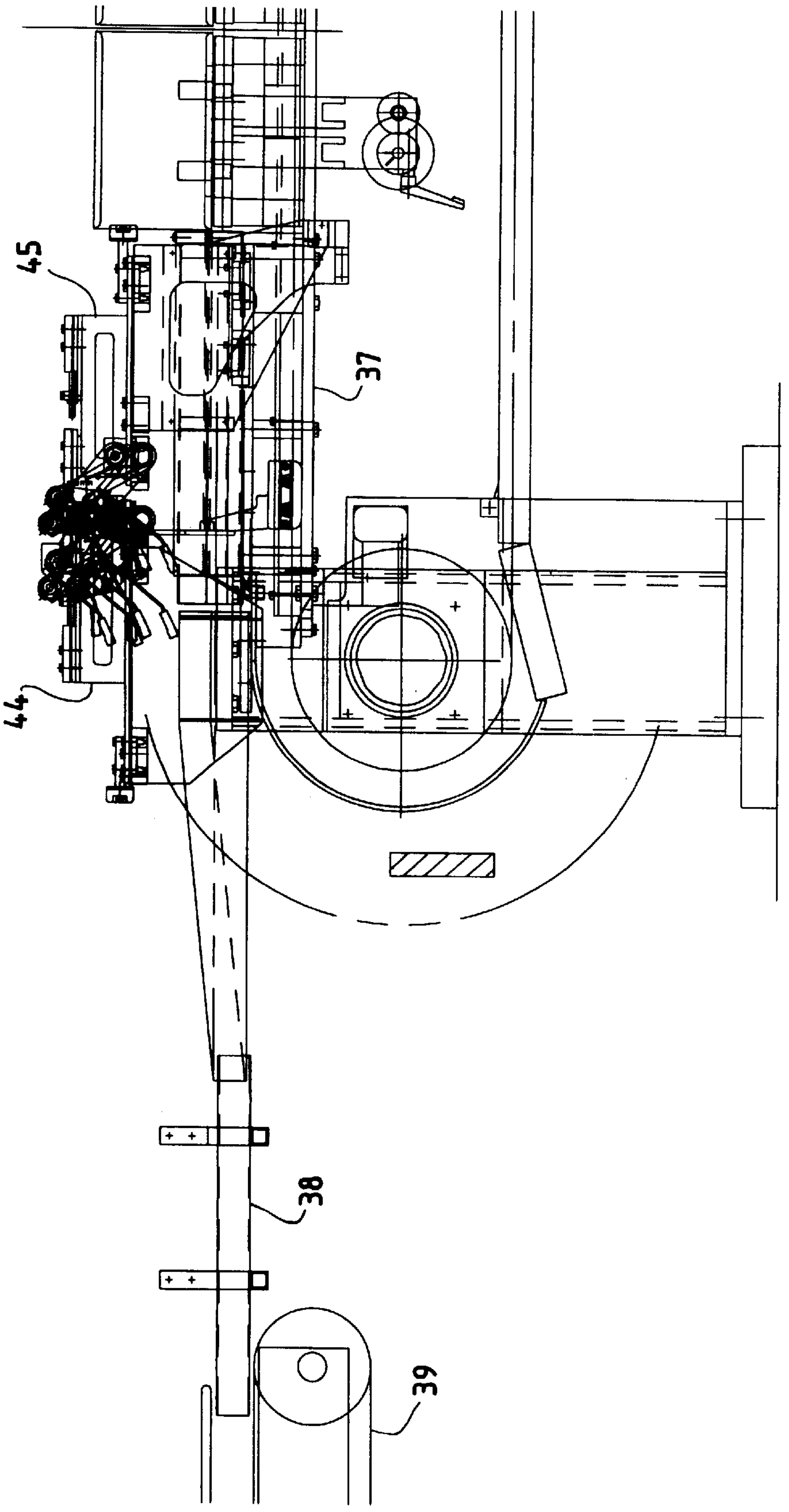
FIG. 11 is a view similar to FIG. 10 but showing both shuttles in their upstream positions.

FIG. 10 illustrates both shuttles in their maximum downstream positions. FIG. 11 illustrates both shuttles in their maximum upstream position (the grippers are omitted for clarity).

Figure 23:
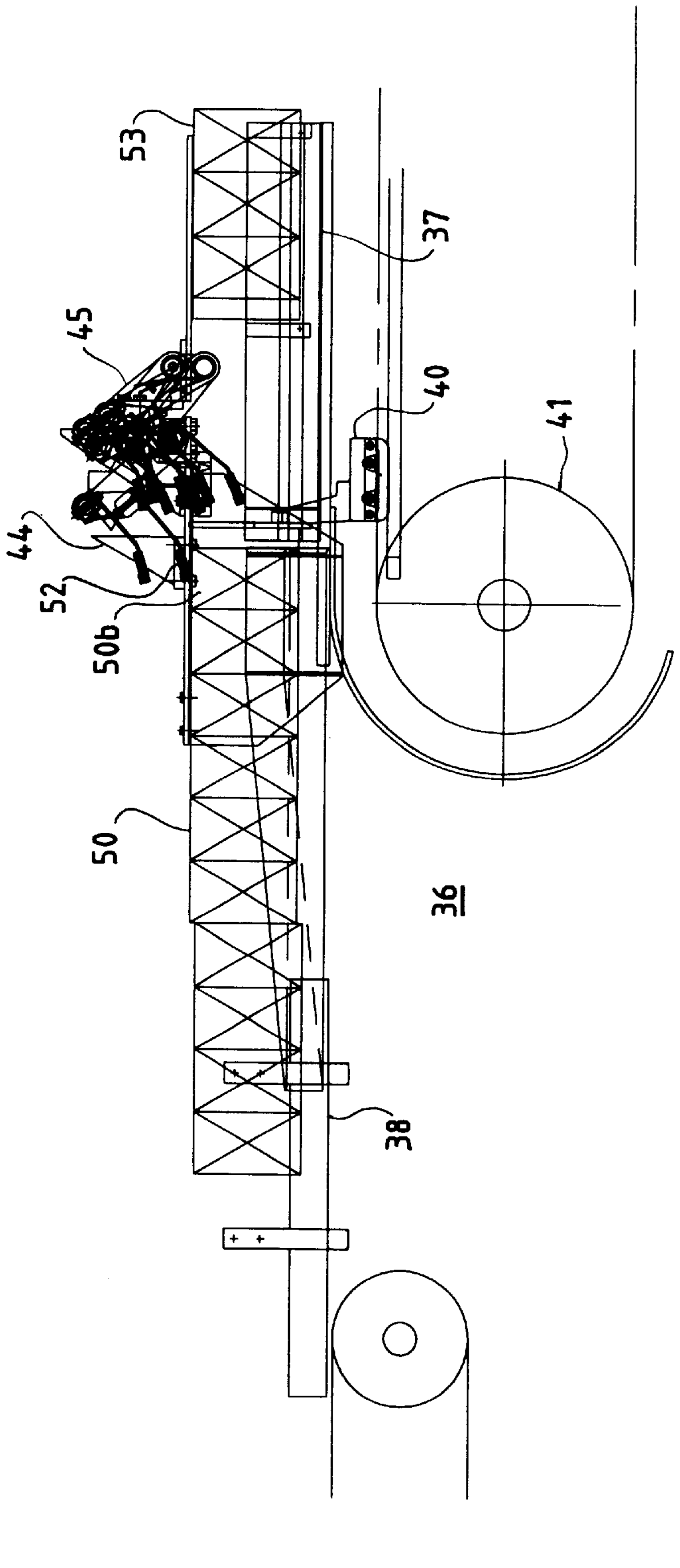
FIG. 23 illustrates a row of cut product moving across the transport apparatus with the upstream trim piece just upstream of the trailing shuttle.

A typical cycle is illustrated in FIGS. 23–26. FIG. 23 illustrates both shuttles 44 and 45 parked together in their upstream positions. This is the "target" position of the trailing shuttle, which is based on the position that the last cut product of a log or bolt will be in when it is to be moved downstream by the trailing shuttle.

The shuttles bridge the opening 36 between the stationary troughs 37 and 38, and a first row (i.e., log or bolt) of cut products 50 is being pushed over the shuttles by a pusher head 40. The last good product or upstream product 50*b* is positioned on the trailing shuttle 44, and the upstream trim piece 51 is off of the shuttle. The upstream product 50*b* is held on the shuttle by a gripper 52. The next row or log 53 is upstream of the row 50.

At this time the trailing shuttle is accelerated in the downstream direction to move the upstream product 50*b* away from the trim 51. The product 50*b* is also moved away from the pusher head 40 so that the pusher head can travel around the pulley 41.

As the trailing shuttle 44 moves away from the leading shuttle 45, the gap 47 is opened between the shuttles. The trim 51 falls through the gap 47 and through the opening 36 (FIG. 9) between the stationary troughs 37 and 38.

Figure 24:
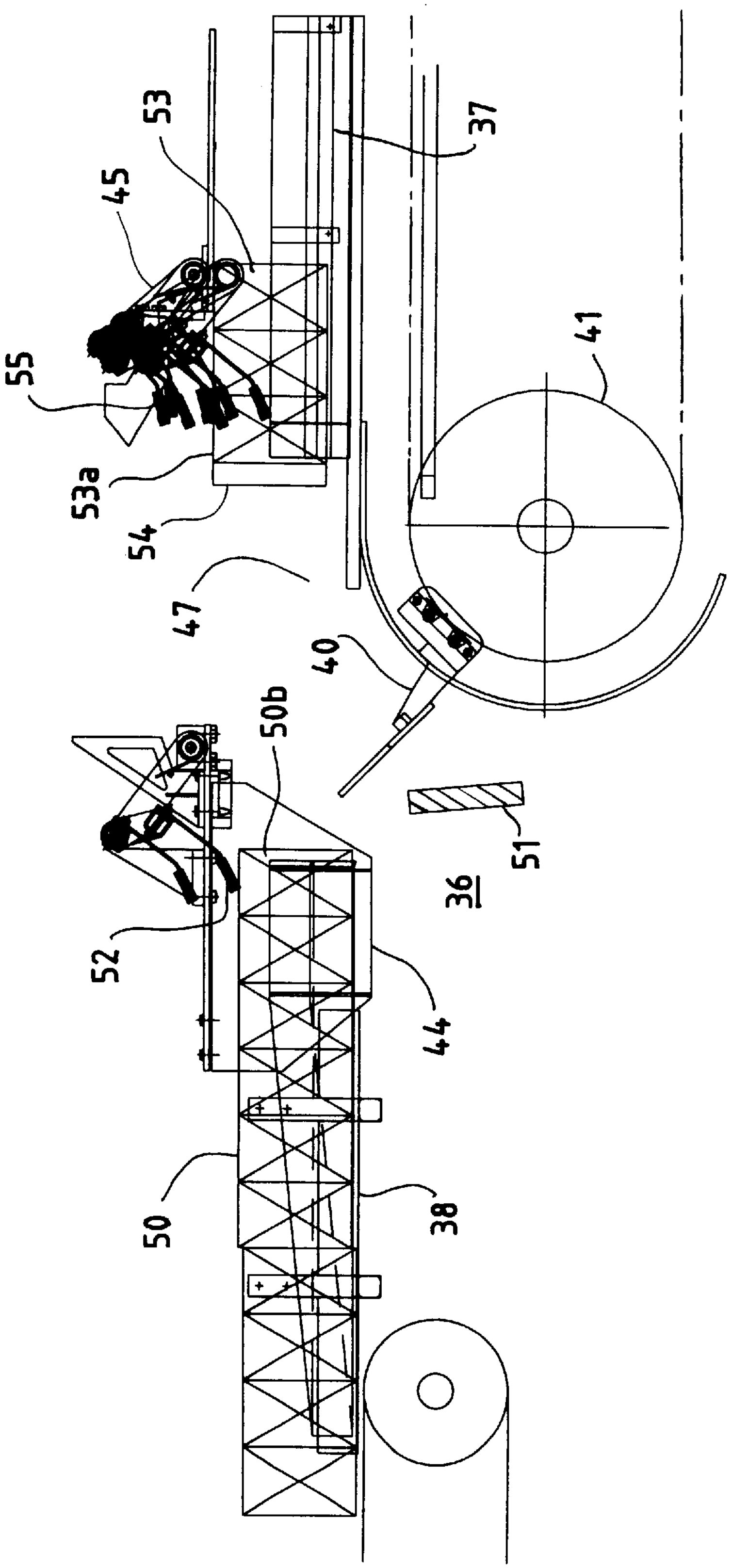
FIG. 24 shows the trailing shuttle in its downstream position, the upstream trim falling through the gap between the shuttles, and the next row of cut product being moved onto the leading shuttle.

As the gap 47 is being generated, the leading shuttle 45 makes a short move to its target position which is based on the predicted position of the first good product or downstream product 53*a* of the next row 53. The trailing shuttle 44 then arrives at its downstream position and dwells (FIG. 24).

Figure 25:
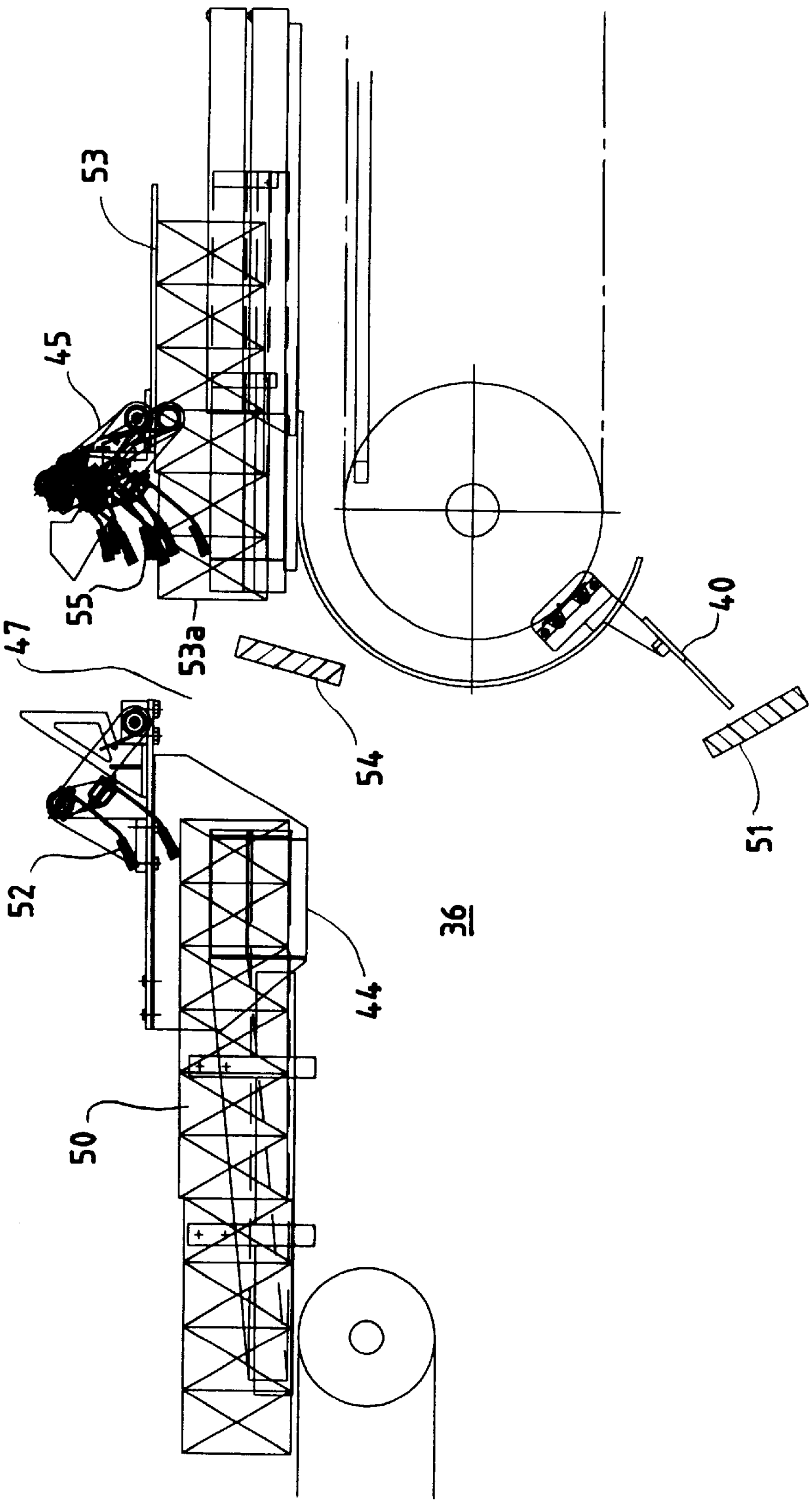
FIG. 25 shows the leading shuttle moving downstream and the downstream trim of the next row of product falling through the gap.

When the first good product 53*a* of the next row reaches its target position (FIG. 24), the leading shuttle 45 accelerates and closes the gap between the shuttles. However, the downstream trim 54 of the row 53 is positioned forwardly of the shuttle and falls into the gap 47 (FIG. 25). The product 53*a* is retained on the shuttle by a gripper 55.

Figure 26:
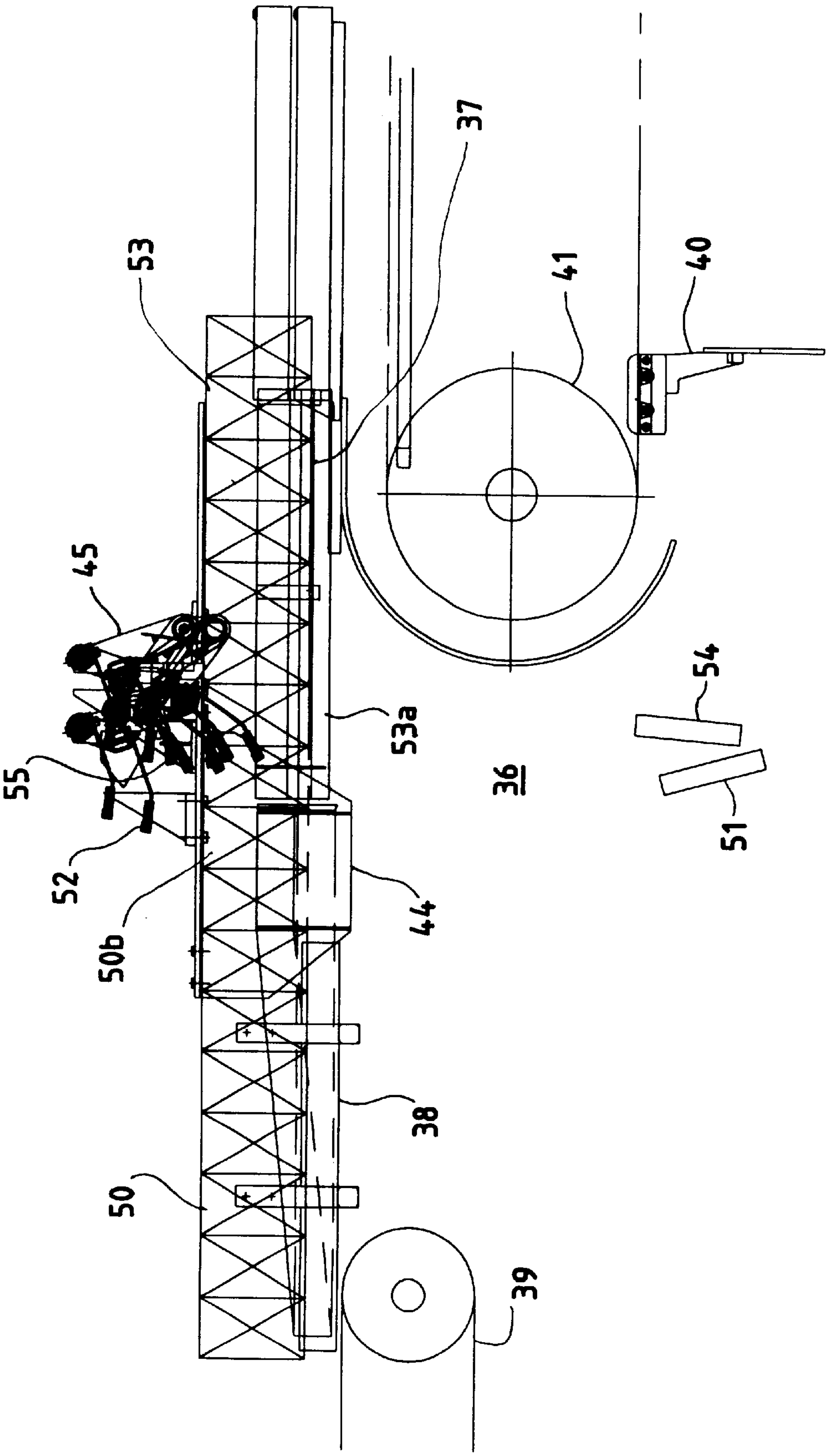
FIG. 26 shows both shuttles in their downstream positions and the second row of product being pushed against the first row of product.

The leading shuttle continues moving to its downstream position (FIG. 26). The last product 50*b* of row 50 and the first product 53*a* of row 53 come together, and the grippers 52 and 55 are raised to release the products. The next pusher head 40 behind the row 53 pushes both rows downstream onto the conveyor 39. The conveyor 39 transports the product downstream to packaging equipment or other processing machinery.

At this time both shuttles return to their upstream positions and are ready for the next cycle.

Each shuttle is long enough to close the gap generated by the movement of the other shuttle. The combined length of the shuttles is greater than the opening 36 between the stationary troughs 37 and 38 plus the maximum travel of either shuttle. The shuttles can thereby provide continuous product support over the opening 36 when the shuttles move as a pair. The trailing shuttle can move "with" the flow of product and generate a gap, and the lead shuttle can move "with" the flow of product to close that same gap, allowing normal product flow. Since the shuttles move "with" the flow of product when generating and then closing the gap, the shuttles provide accurate support of quality product while allowing undesired product to fall out of the flow. After each such cycle, the shuttles return to their starting points as a pair, while providing product support, as the next pusher head keeps the flow of product moving forward.

The shuttles can be used not only for culling trim pieces, but also for culling any particular product from a row of products. For example, a selected roll in the middle of a log of cut rolls can be culled for sampling by accelerating the trailing shuttle to open the gap just before the selected roll is supported by the trailing shuttle. Rolls upstream of the selected roll will be supported by the leading shuttle.

Gravity is generally sufficient to cause the trim or other culls to fall through the gap between the shuttles. However, sometimes the trimmed ends apparently loosely reattach themselves to the adjacent good product by intertwining of their fibers. If this reattachment is sufficient to prevent the trim from falling through the gap, some additional force might have to be exerted on the trim. This is best done with a non-contact device such as a timed air blast. A stationary air blast nozzle can be attached to the frame of the transport assembly for trims which are loosely attached. If a prolonged air blast is needed, a nozzle can be mounted on each of the shuttles.

DETAILED DESCRIPTION

Figure 6:
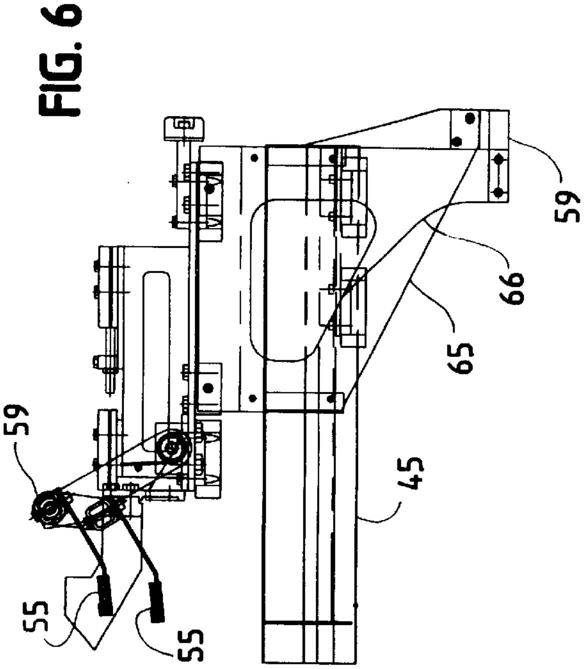
FIG. 6 is a side elevational view of the leading shuttle.
Figure 8:
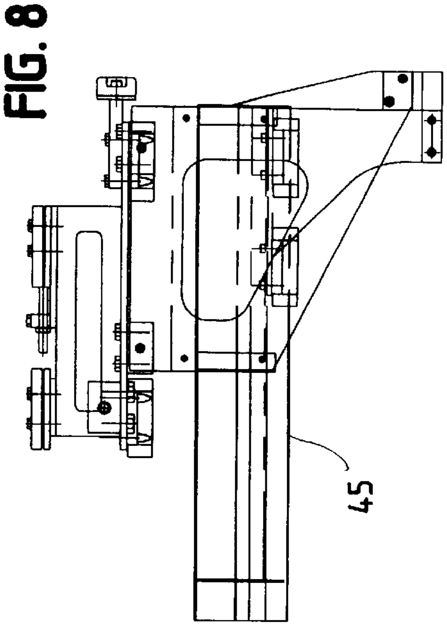
FIG. 8 illustrates the leading shuttle without the grippers.
Figure 13:
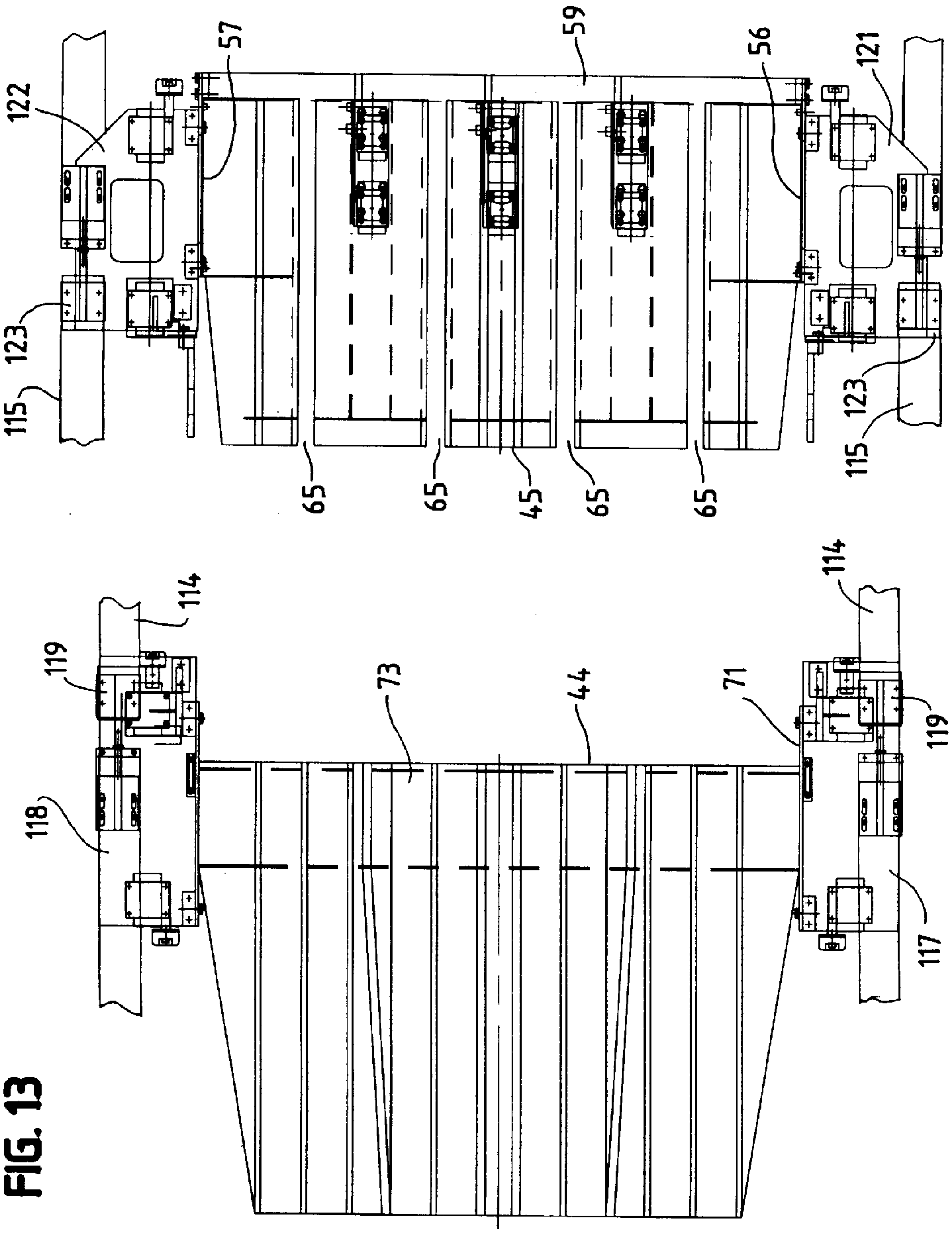
FIG. 13 is a top plan view similar to FIG. 12 but showing only the shuttles.
Figure 14:
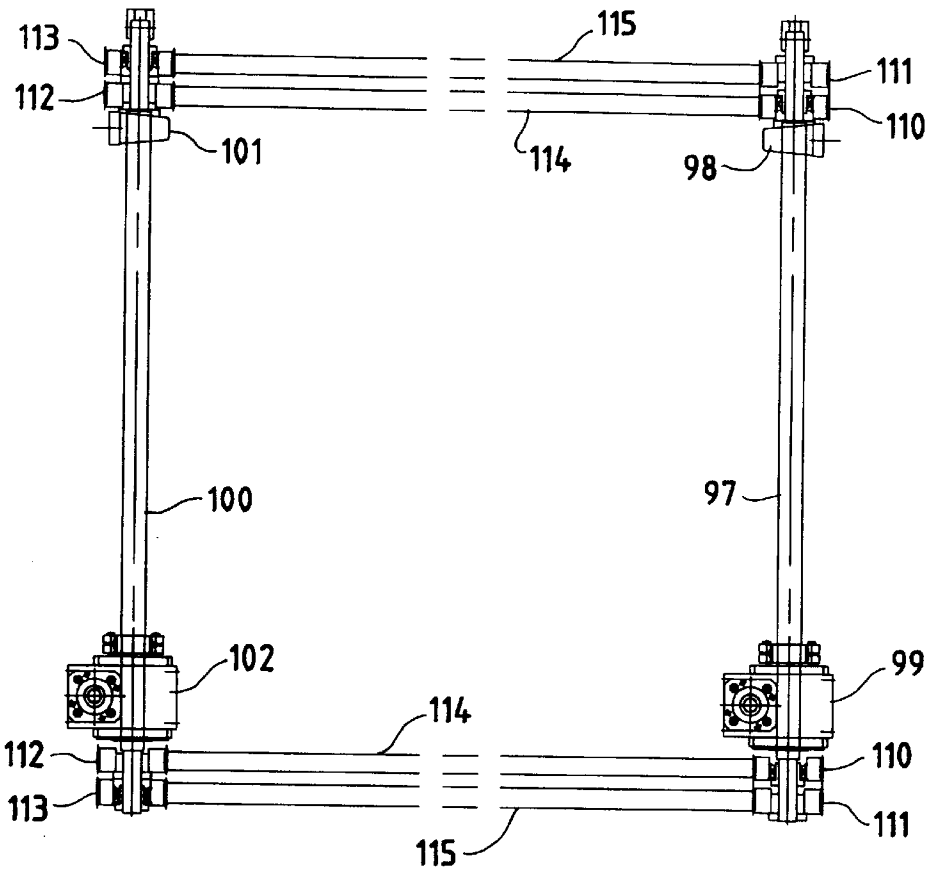
FIG. 14 is a top plan view of the drive shafts and drive belts of the transport apparatus.
Figure 17:
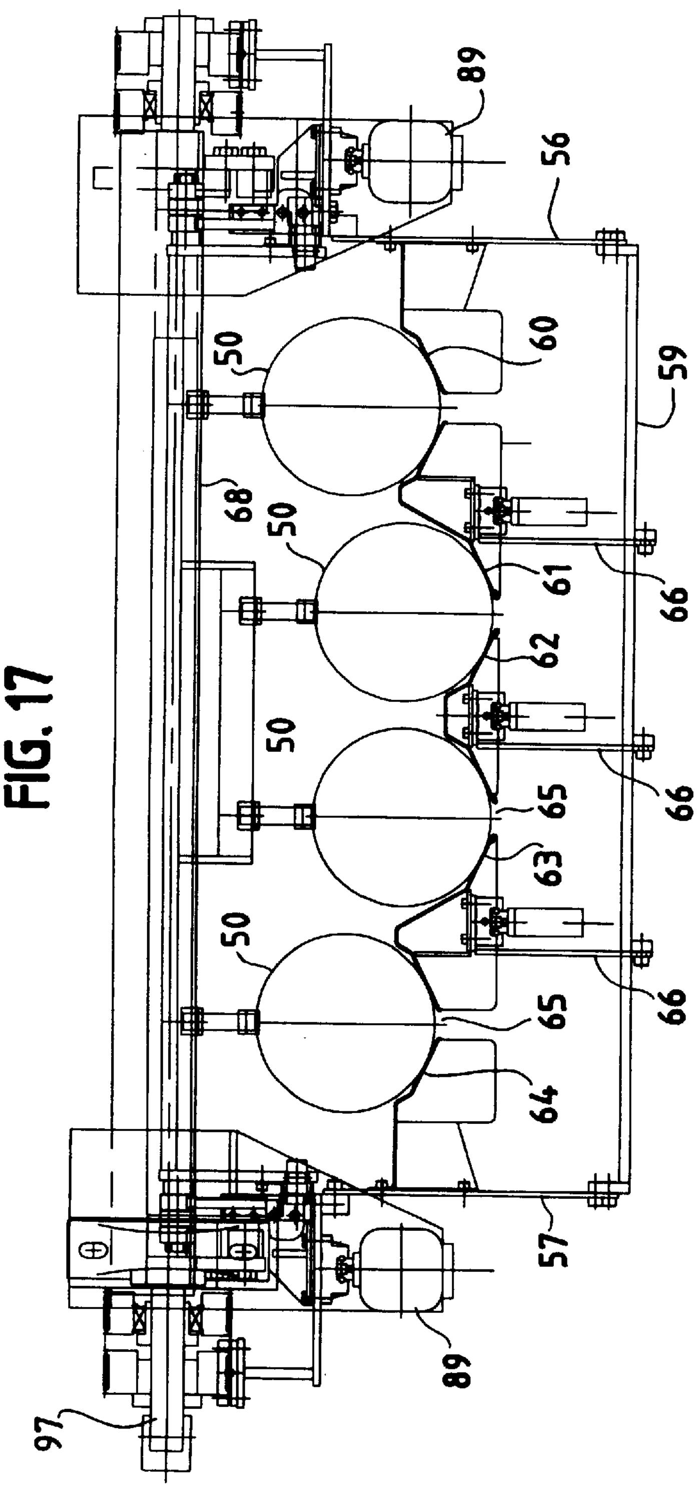
FIG. 17 is a view similar to FIG. 16 but showing only the transport apparatus.
Figure 19:
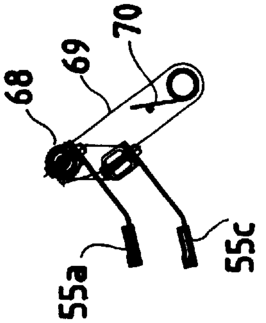
FIG. 19 is a side view of one of the grippers.

Referring to FIGS. 6, 13, and 17, the leading shuttle 45 includes a pair of side walls 56 and 57, bottom connecting arm 59, and a plurality of trough-forming plates 60–64 which form four troughs, one for each lane of the log saw. FIG. 17 illustrates a row of products 50 supported on each trough. Each trough is provided with a slot 65 for allowing the pusher heads 40 of the saw conveyor to pass. The troughs are supported by the sidewalls 56 and 57 and by vertical plates 66.

Figure 16:
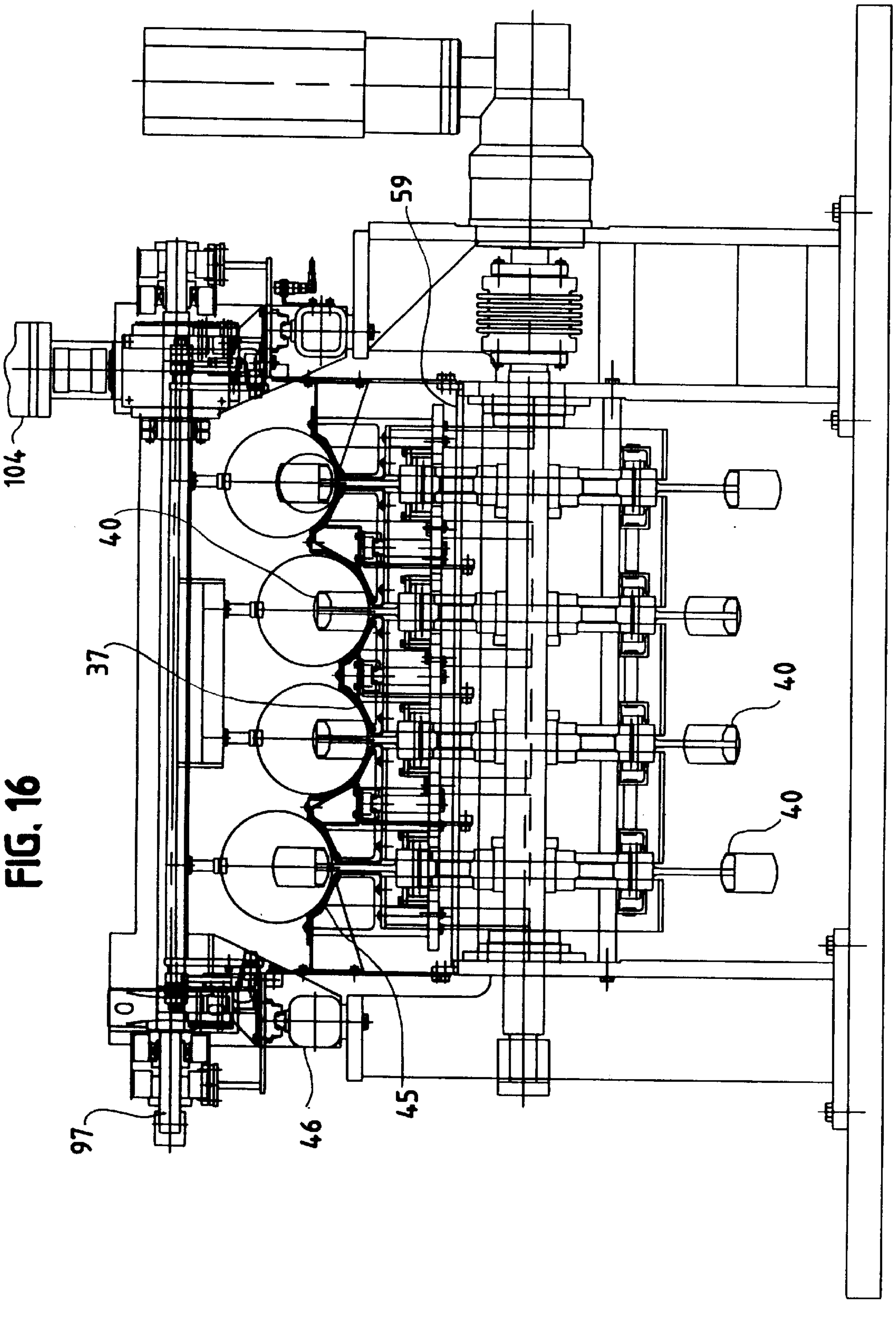
FIG. 16 is a view taken along the line 16—16 of FIG. 2.

The troughs of the leading shuttle are shaped like the stationary trough 37 of the log saw and slide under the stationary trough when the shuttle is in its maximum upstream position (see FIG. 16).

Figure 18:
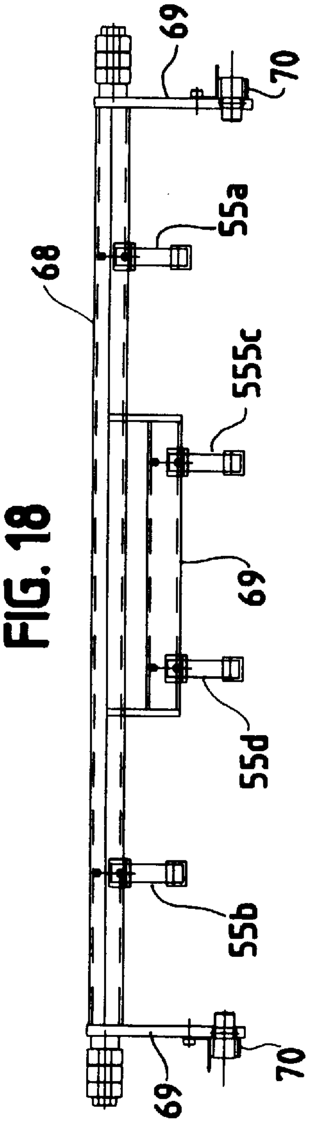
FIG. 18 illustrates the gripper assembly for the leading shuttle.

The grippers 55 are mounted on a shaft 68 (FIG. 18) which is rotatably mounted on the leading shuttle. The two end grippers 55*a* and 55*b* are mounted directly on the shaft 68, and the two middle grippers 55*c* and 55*d* are mounted on a short parallel shaft 69 which is attached to the shaft 68. Each gripper comprises a resilient finger or spring arm which is engageable with the product on the associated trough.

The grippers are mounted on the shuttle and are therefore always positioned correctly relative to the troughs to pinch the product onto the shuttle. The on-off pivoting action of the grippers is controlled by rotating the shaft 68 by lever arms 69. The arms are resiliently biased by springs 70 to move the grippers against the product. The lever arms can be pivoted, for example, by pneumatic cylinders and solenoid valves. However, a mechanical control may be best for cost, repeatability, reliability, and speed sensitivity. With a combination of stationary stops and ramps on the frame of the transport assembly plus shuttle mounted stops and ramps, the grippers can be controlled repeatably regardless of machine speed and can be opened reliably and positively at the downstream end of travel.

Figure 5:
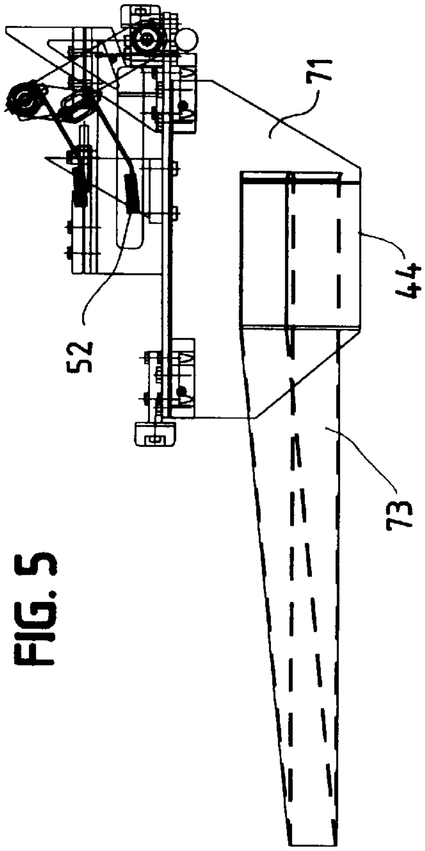
FIG. 5 is a side elevational view of the trailing shuttle.
Figure 7:
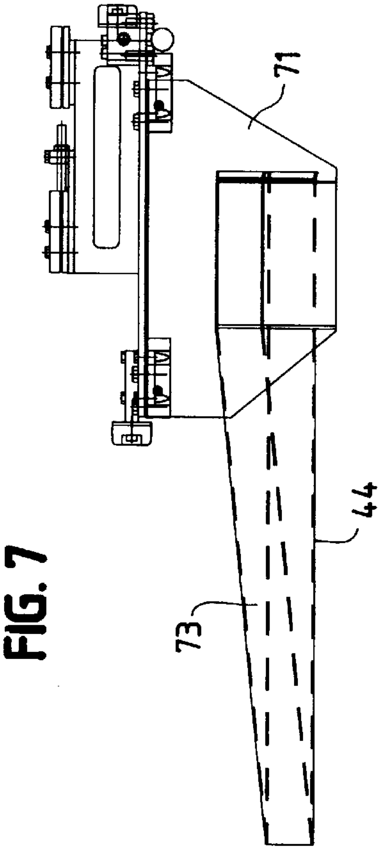
FIG. 7 illustrates the trailing shuttle without the grippers.
Figure 20:
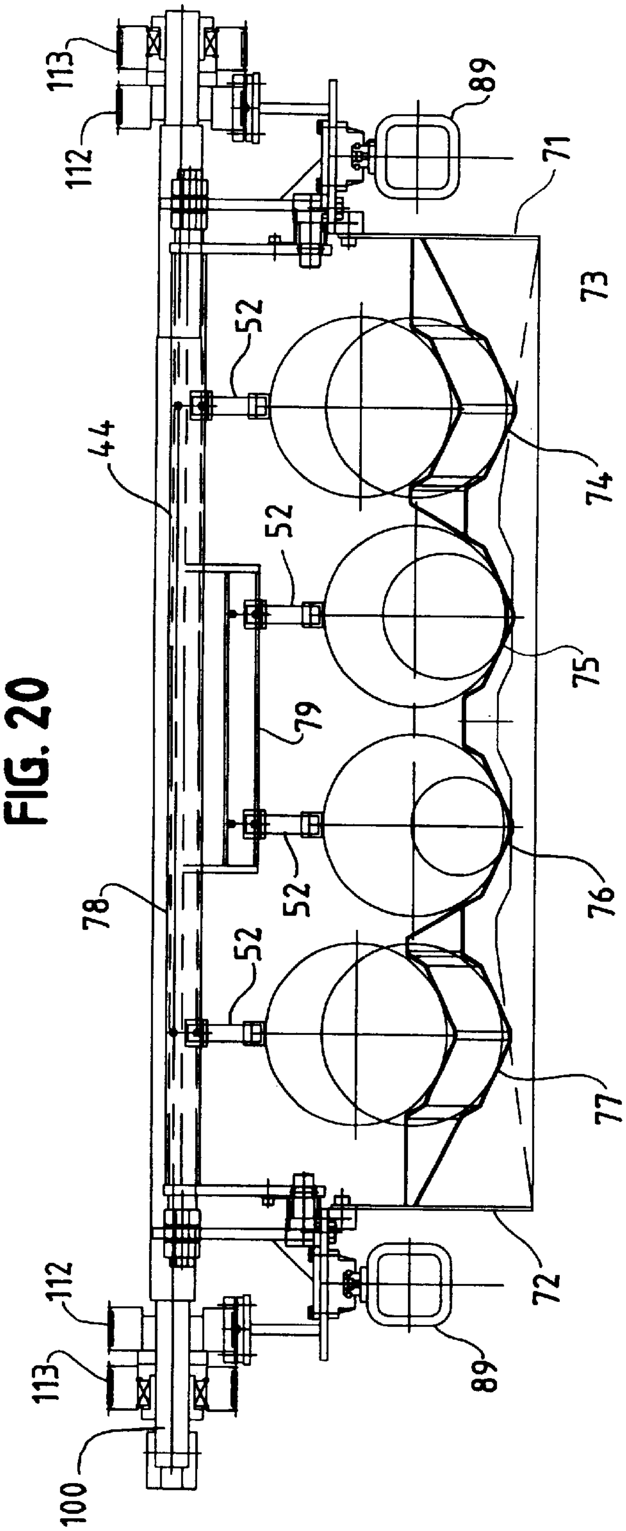
FIG. 20 illustrates the downstream end of the trailing shuttle.

The trailing shuttle 44 is shown in FIGS. 5, 13, and 20. The trailing shuttle is similar to the leading shuttle but does not need slots to allow for passage of the pusher heads 40.

The trailing shuttle includes side walls 71 and 72 and a bottom plate 73 which provides troughs 74–77. The grippers 52 are attached to a shaft 78 (FIG. 20) which is rotatably mounted on the side walls. The middle grippers are attached to a short parallel shaft 79. The shaft 78 is controlled in the same way as the shaft 68 to operate the grippers.

Another method for making sure that the product on the trailing shuttle, based on its higher acceleration when pulling away from the pusher head of the saw conveyor, will accelerate with the shuttle and not slide backward is to add a one way traction device to the trough surfaces. This device would add traction against the product as the shuttle moves downstream but easily slide against the product as the shuttle moves upstream or is parked. This device could take the form of a louvered strip or a unidirectional fiber mat, e.g., a lint brush.

Figure 21:
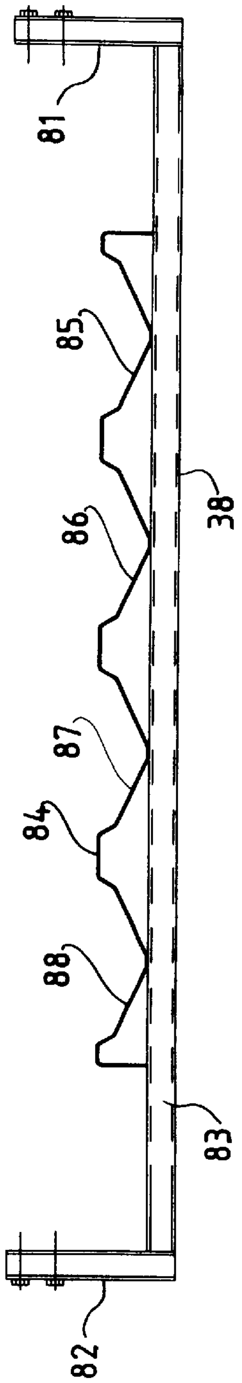
FIG. 21 is an end view of the stationary trough of the downstream conveyor.

The trailing shuttle cooperates with the stationary trough 38 which is illustrated in FIG. 21. The stationary trough includes side arms 81 and 82 and bottom arms 83 which support a bottom plate 84 which is provided with troughs 85–88. The side arms are attached to tubes 89 (FIG. 22) on the frame of the transport assembly. If desired, the stationary trough can be omitted, and the trailing shuttle could deliver product directly to the downstream conveyor if the downstream conveyor was positioned farther upstream.

Figure 22:
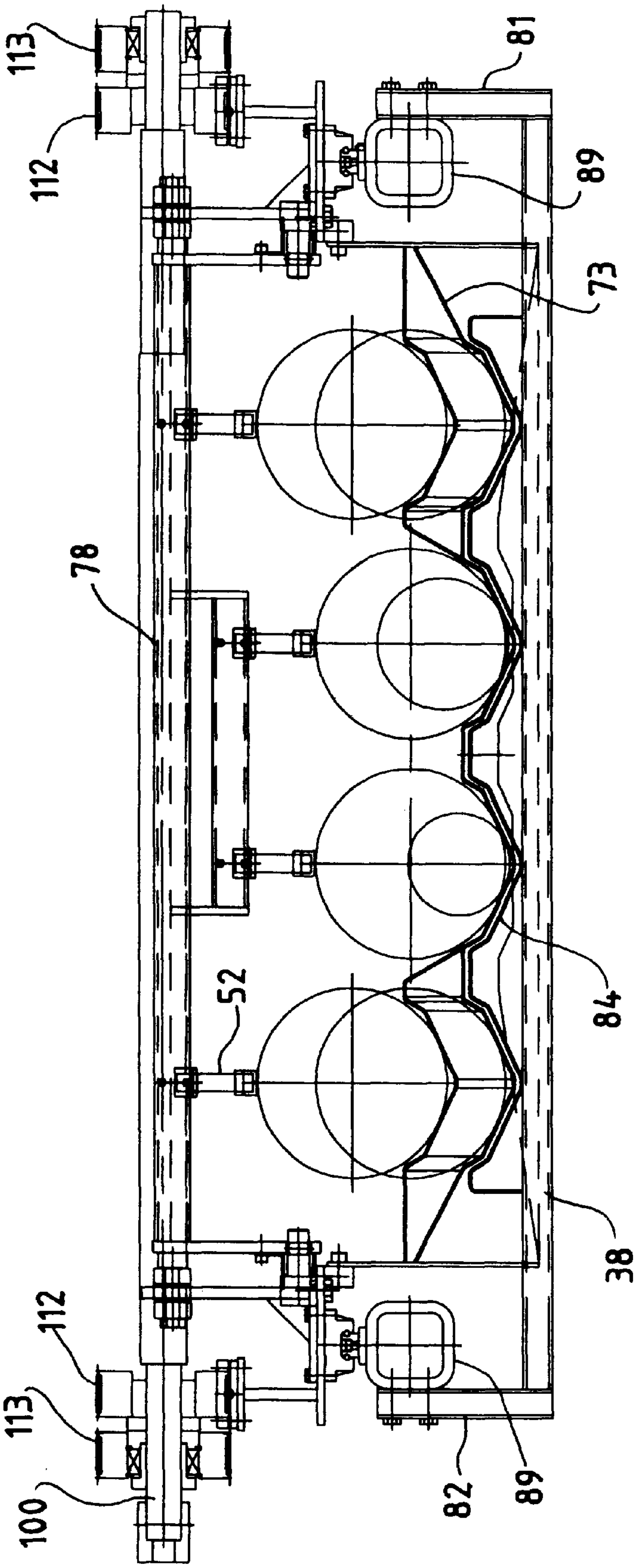
FIG. 22 illustrates the trailing shuttle of FIG. 20 and the stationary trough of FIG. 21.

When the trailing shuttle reaches its downstream position, the bottom plate 73 of the shuttle slides over the bottom plate 84 of the stationary shuttle so that the troughs are superposed as shown in FIG. 22. The product can therefore move easily from the shuttle to the stationary trough.

Figure 15:
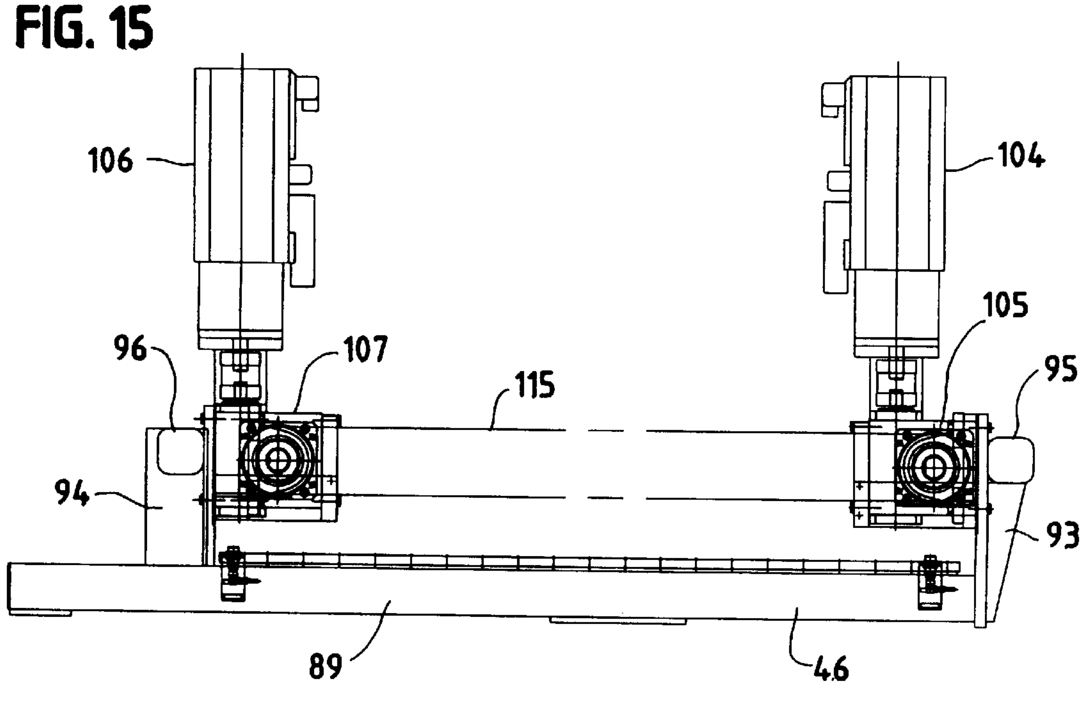
FIG. 15 is a side elevational view of the transport apparatus without the shuttles.

Referring to FIGS. 12, 15, and 16, the transport assembly includes a generally rectangular frame 46 which includes a pair of horizontal side tubes 89 (see also FIGS. 17, 20, and 22), vertical support brackets 93 and 94 on each end of the side tubes, and horizontal cross tubes 95 and 96 which are attached to the support brackets.

An upstream drive shaft 97 is supported by bearing 98 and upstream gear box 99 which are mounted on the upstream brackets 93. A downstream drive shaft 100 is supported by bearing 101 and downstream gear box 102 which are mounted on the downstream brackets 94. The upstream drive shaft is rotated by an upstream servo motor 104 and the right angle worm gear box 99 which are mounted on the right side support bracket 93. The downstream drive shaft is rotated by a downstream servo motor 106 and the right angle worm gear box 102 which are mounted on the right side support bracket 94.

Inside and outside timing pulleys 110 and 111 are mounted on each end of the drive shaft 97, and inside and outside timing pulleys 112 and 113 are mounted on each end of the drive shaft 100. Inside and outside belts 114 and 115 are entrained around the inside and outside pulleys, respectively. The inside pulleys 112 are non-rotatably connected to the drive shaft 100, and the other inside pulleys 110 mounted on a bearing on shaft 97 so that the pulleys 110 can idle. The outside pulleys 111 are non-rotatably connected to the drive shaft 97, and the other outside pulleys 113 idle on shaft 100. The belts 114 are therefore driven by servo motor 106, and the belts 115 are driven by servo motor 104.

Referring to FIG. 13, the trailing shuttle 44 includes laterally extending side wings 117 and 118 which extend outwardly over the inside belts 114. The wings are clamped to the lower run of the inside belts by clamps 119 (see also FIGS. 2 and 12).

Similarly, the leading shuttle 45 includes laterally extending side wings 121 and 122 which extend outwardly over the outside belts 115. The wings are clamped to the lower run of the outside belts by clamps 123.

The trailing shuttle is reciprocated by the inside belts 114 and the associated servo motor 106. The leading shuttle is reciprocated by the outside belts 115 and the associated servo motor 104. Each shuttle can therefore be moved independently of the other.

The servo motors are controlled by the PLC of the saw to position and time the shuttles properly based on the rate and length of product being produced. The shuttles could also be directly driven by linear actuators with position feedback such as a linear motor or a servo hydraulic cylinder.

The transport apparatus provides the following advantages:

1. Within typical product size ranges, only automatic electrical adjustments are needed when changing product parameters like cut length, height or diameter, trim length, bolt or log length.
2. Even when grippers are used, only two products out of each bolt or log are contacted by something other than the troughs. This will minimize product marking and sensitivity to loose tails or glue present on product surface.
3. As compared to the vacuum support of the rolls over the opening, the shuttle system uses less energy and produces less noise.
4. The same shuttle concept applies equally well from indexing to continuous motion saws.
5. The shuttle system can remove full length cut products as well as trim. Removal of full length products will aid in quality control and efficiency issues as well as giving the ability to drop product from the output flow of the saw, thereby preventing a backup of product into the cutting zone.

While in the foregoing specification a detailed description of a specific embodiment of the invention was set forth for the purpose of illustration, it will be understood that many of the details herein given can be varied considerably by those skilled in the art without departing from the spirit and scope of the invention.

I claim:

1. An apparatus for handling rows of units of multi-ply material such as rolls of bathroom tissue or paper toweling and stacks of folded facial tissue or toweling, each row having an upstream end and a downstream end and including an upstream unit, a downstream unit, and a plurality of units therebetween, comprising a frame having an upstream end and a downstream end and an opening between the ends, a trailing shuttle reciprocatingly mounted on the frame for movement between an upstream position and a downstream position, means for moving the trailing shuttle between the upstream and downstream positions, a leading shuttle reciprocatingly mounted on the frame upstream of the trailing shuttle for movement between an upstream position and a downstream position, means for moving the leading shuttle between the upstream and downstream positions, the shuttles forming a substantially continuous support surface when both shuttles are in their upstream positions and when both shuttles are in their downstream positions whereby units of multi-ply material can be conveyed over the shuttles without falling into the opening of the frame, the shuttles being spaced from each other when the trailing shuttle is in its downstream position and the leading shuttle in its upstream position whereby selected units can fall between the shuttles and through the opening in the frame.

2. The apparatus of claim 1 including a gripper mounted on the trailing shuttle for holding a unit of multi-ply material as the trailing shuttle moves from its upstream position to its downstream position.

3. The apparatus of claim 1 including a gripper mounted on the leading shuttle for holding a unit of multi-ply material as the leading shuttle moves from its upstream position to its downstream position.

4. The apparatus of claim 1 including an upstream drive shaft and a downstream drive shaft, first and second belts extending around the drive shafts, one of the belts being drivingly connected to the upstream drive shaft and the other belt being drivingly connected to the downstream drive shaft, one of the shuttles being connected to one of the belts and the other shuttle being connected to the other belt.

5. The apparatus of claim 4 including an upstream servo motor connected to the upstream drive shaft and a downstream servo motor connected to the downstream drive shaft for rotating the drive shafts.

6. The apparatus of claim 4 including first and second pulleys mounted on each of the drive shafts, the first belt being entrained around the first pulley on each drive shaft, the second belt being entrained around the second pulley on each drive shaft, the first pulley on the upstream drive shaft being non-rotatably mounted on said drive shaft and the second pulley on the upstream drive shaft being rotatably mounted on said drive shaft, the second pulley on the downstream drive shaft being non-rotatably mounted on said drive shaft and the first pulley on the downstream drive shaft being rotatably mounted on said drive shaft.

7. The apparatus of claim 6 including a servo motor connected to each of the drive shafts.

* * * * *